United States Patent
Ait Aoudia et al.

(10) Patent No.: US 11,070,410 B1
(45) Date of Patent: Jul. 20, 2021

(54) TRANSMITTER

(71) Applicant: NOKIA TECHNOLOGIES OY, Espoo (FI)

(72) Inventors: Faycal Ait Aoudia, Saint-Cloud (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/149,268

(22) Filed: Jan. 14, 2021

(30) Foreign Application Priority Data

Jan. 15, 2020 (FI) ........................................ 20205038

(51) Int. Cl.
| | | |
|---|---|---|
| *H04L 27/04* | (2006.01) | |
| *H04L 27/36* | (2006.01) | |
| *G06N 3/04* | (2006.01) | |
| *G06F 17/16* | (2006.01) | |
| *G06N 3/08* | (2006.01) | |

(52) U.S. Cl.
CPC .............. *H04L 27/04* (2013.01); *G06F 17/16* (2013.01); *G06N 3/04* (2013.01); *G06N 3/08* (2013.01); *H04L 27/36* (2013.01)

(58) Field of Classification Search
CPC ......... H04L 27/04; H04L 27/36; G06F 17/16; G06N 3/04; G06N 3/08
See application file for complete search history.

(56) References Cited

U.S. PATENT DOCUMENTS

| | | | |
|---|---|---|---|
| 2018/0026725 A1 | 1/2018 | Cho | |
| 2018/0367192 A1* | 12/2018 | O'Shea | ................ H04B 7/0413 |
| 2019/0109752 A1 | 4/2019 | Zhang et al. | |
| 2019/0164290 A1* | 5/2019 | Wang | ................. G06K 9/00973 |
| 2021/0067397 A1* | 3/2021 | Liston | ................. H04L 27/2649 |

FOREIGN PATENT DOCUMENTS

WO WO 2019/038693 A1 2/2019

OTHER PUBLICATIONS

Office Action dated May 29, 2020 corresponding to Finnish Patent Application No. 20205038.
Finnish Search Report dated May 29, 2020 corresponding to Finnish Patent Application No. 20205038.
M. Stark et al., "Joint Learning of Geometric and Probabilistic Constellation Shaping," In: 2019 IEEE Globecom Workshops (GC Wkshps), IEEE, 2019.
K. Gumus et al., "End-to-End Learning of Geometrical Shaping Maximizing Generalized Mutual Information." In: arXiv [online], Dec. 12, 2019.

(Continued)

*Primary Examiner* — Dhaval V Patel
(74) *Attorney, Agent, or Firm* — Squire Patton Boggs (US) LLP

(57) ABSTRACT

To support a wide range of code rates in probabilistic shaping based modulation schemes solutions, a constellation which is at least based on a trained model is used in the modulation. Depending on an implementation the trained model may be a constellation comprising a plurality of sub-constellations with trained parameters as constellation points, or the trained model may be for generating a constellation and corresponding constellation points.

12 Claims, 4 Drawing Sheets

(56) References Cited

OTHER PUBLICATIONS

Office Action dated Dec. 18, 2020 corresponding to Finnish Patent Application No. 20205038.
Communication of Acceptance under section 29a of Patents Decree dated Jan. 12, 2021 corresponding to Finnish Patent Application No. 20205038.
Extended European Search Report dated Jun. 9, 2021 corresponding to European Patent Application No. 21150083.0.
Banghua Zhu et al., "Joint Transceiver Optimization for Wireless Communication PHY Using Neural Network," IEEE Journal on Selected Areas in Communications, vol. 37, No. 6, Jun. 1, 2019, pp. 1364-1373, XP011724548.
Toshiki Matsumine et al., "Deep Learning-Based Constellation Optimization for Physical Network Coding in Two-Way Relay Networks," ICC 2019-2019 IEEE International Conference on Communications (ICC), May 20, 2019, pp. 1-6, XP033582472.

\* cited by examiner

TRANSMITTER

TECHNICAL FIELD

Various example embodiments relate to wireless communications and, particularly, to a mapper in a transmitter.

BACKGROUND

Wireless communication systems are under constant development. Advancements in modulation techniques, and coding algorithms, for example, have vastly increased the data transmission rates. At a transmitter side, one of the modulation schemes used is probabilistic amplitude shaping, which combines error correction code and probabilistic shaping. The probabilistic amplified shaping uses bipolar amplitude shift keying (ASK) constellations for modulation, and is applicable to quadrature amplitude modulation (QAM) with specific code rates.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided a transmitter comprising at least means for performing: receiving bits to be sent from the transmitter; performing distributing matching and channel coding to the received bits to generate matched bits and parity bits; using the parity bits to select a sub-constellation amongst a plurality of sub-constellations of a constellation, the constellation being at least based on a trained model, which is based on an algorithm with trainable parameters; using the matched bits and the selected sub-constellation to generate modulated symbols; and causing sending the modulated symbols.

In an embodiment, the transmitter further comprises means for performing: mapping the matched bits to one-hot vectors; and taking dot products of the one-hot vectors and the sub-constellation to generate the modulated symbols.

In an embodiment, the transmitter further comprises means for performing: inputting information indicating channel quality to the trained model, which outputs the constellation comprising a plurality of sub-constellations.

In an embodiment, the constellation is the trained model.

In an embodiment, the transmitter further comprises means for performing the distribution matching using as a target distribution a distribution, which is learned during training the trained model.

In an embodiment, the means comprises at least one processor; and at least one memory including computer program code, the at least one memory and computer program code configured to, with the at least one processor, cause the performance of the transmitter.

Another aspect provides an apparatus comprising means for performing at least: acquiring a model modeling at least a mapper at a transmitter side, wherein at least an algorithm with trainable parameters is used to model the mapper; initializing parameters for the algorithm; sampling a batch of training data; performing to the batch a forward pass through the model to generate soft predictions of the batch; updating the parameters by applying one step of a stochastic gradient descent on a loss function; training the parameters by repeating the sampling, performing the forward pass and updating until a stop criterion is fulfilled; and stopping the training when the stop criterion is fulfilled.

In an embodiment, the apparatus further comprises means for performing storing, after stopping the training, a trained model for the mapper.

In an embodiment, the batch is a batch of codewords generated using a systematic channel code.

In an embodiment, the model further comprises at the transmitter side a second algorithm with trainable parameters to generate, as part of the sampling, bit vectors according to a trainable distribution, the bit vectors generated forming part of the batch of training data, and the apparatus further comprises means for performing: initializing parameters for the second algorithm; and storing, after stopping the training, the trained parameters of the second algorithm to be used as a target distribution.

In an embodiment, the algorithm, which is used to model the mapper, is a neural network for generating a constellation.

In an embodiment, the trainable parameters in the algorithm, which is used to model the mapper, are constellation points in sub-constellations.

In an embodiment, the means comprises at least one processor; and at least one memory including computer program code, the at least one memory and computer program code configured to, with the at least one processor, cause the performance of the apparatus.

An aspect provides a method comprising at least: receiving bits to be sent from the transmitter; performing distributing matching and channel coding to the received bits to generate matched bits and parity bits; using the parity bits to select a sub-constellation amongst a plurality of sub-constellations of a constellation, the constellation being at least based on a trained model, which is based on an algorithm with trainable parameters; using the matched bits and the selected sub-constellation to generate modulated symbols; and causing sending the modulated symbols.

An aspect provides a method comprising at least: acquiring a model modeling at least a mapper at a transmitter side, wherein at least an algorithm with trainable parameters is used to model the mapper; initializing parameters for the algorithm; sampling a batch of training data; performing to the batch a forward pass through the model to generate soft predictions of the batch; updating the parameters by applying one step of a stochastic gradient descent on a loss function; training the parameters by repeating the sampling, performing the forward pass and updating until a stop criterion is fulfilled; and stopping the training when the stop criterion is fulfilled.

An aspect provides a computer program comprising instructions which, when the program is executed by an apparatus, cause the apparatus to carry out at least: performing, in response to receiving bits to be sent, distributing matching and channel coding to the received bits to generate matched bits and parity bits; using the parity bits to select a sub-constellation amongst a plurality of sub-constellations of a constellation, the constellation being at least based on a trained model, which is based on an algorithm with trainable parameters; using the matched bits and the selected sub-constellation to generate modulated symbols; and causing sending the modulated symbols An aspect provides a computer program comprising instructions which, when the program is executed by an apparatus, cause the apparatus to carry out at least: acquiring a model modeling at least a mapper at a transmitter side, wherein at least an algorithm with trainable parameters is used to model the mapper; initializing parameters for the algorithm; sampling a batch of training data; performing to the batch a forward pass through the model to generate soft predictions of the batch; updating the parameters by applying one step of a stochastic gradient descent on a loss function; training the parameters by repeating the sampling, performing the forward pass and updating until a stop criterion is fulfilled; and stopping the training when the stop criterion is fulfilled.

An aspect provides a non-transitory computer-readable storage medium storing one or more instructions which, when executed by one or more processors, cause an apparatus to carry out at least: performing, in response to receiving bits to be sent, distributing matching and channel coding to the received bits to generate matched bits and parity bits; using the parity bits to select a sub-constellation amongst a plurality of sub-constellations of a constellation, the constellation being at least based on a trained model, which is based on an algorithm with trainable parameters; using the matched bits and the selected sub-constellation to generate modulated symbols; and causing sending the modulated symbols.

An aspect provides a non-transitory computer-readable storage medium storing one or more instructions which, when executed by one or more processors, cause an apparatus to carry out at least: acquiring a model modeling at least a mapper at a transmitter side, wherein at least an algorithm with trainable parameters is used to model the mapper; initializing parameters for the algorithm; sampling a batch of training data; performing to the batch a forward pass through the model to generate soft predictions of the batch; updating the parameters by applying one step of a stochastic gradient descent on a loss function; training the parameters by repeating the sampling, performing the forward pass and updating until a stop criterion is fulfilled; and stopping the training when the stop criterion is fulfilled.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
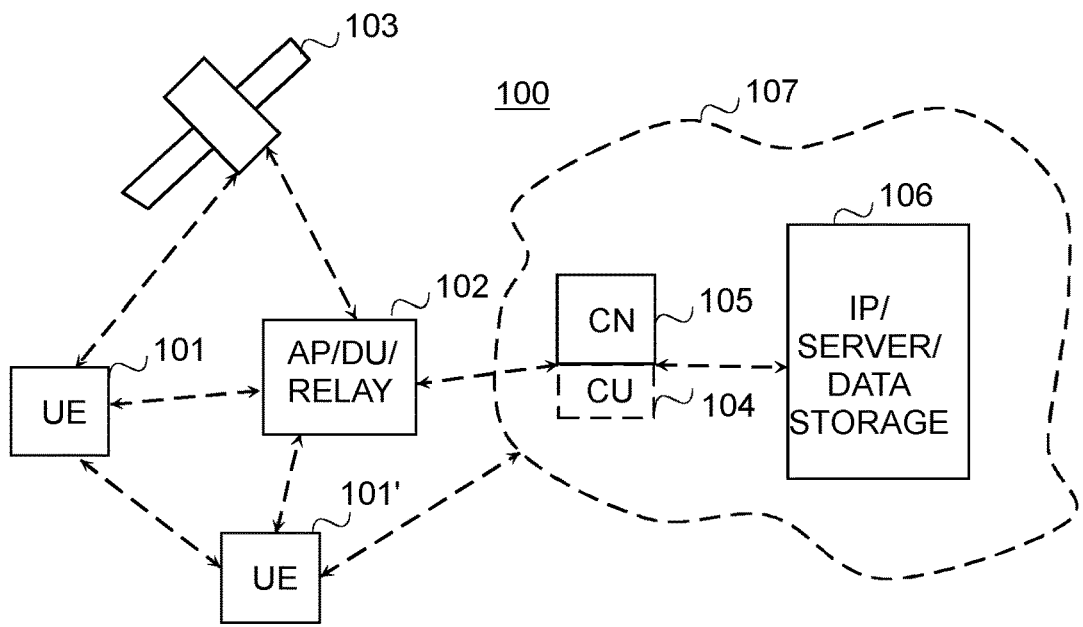
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR)

networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
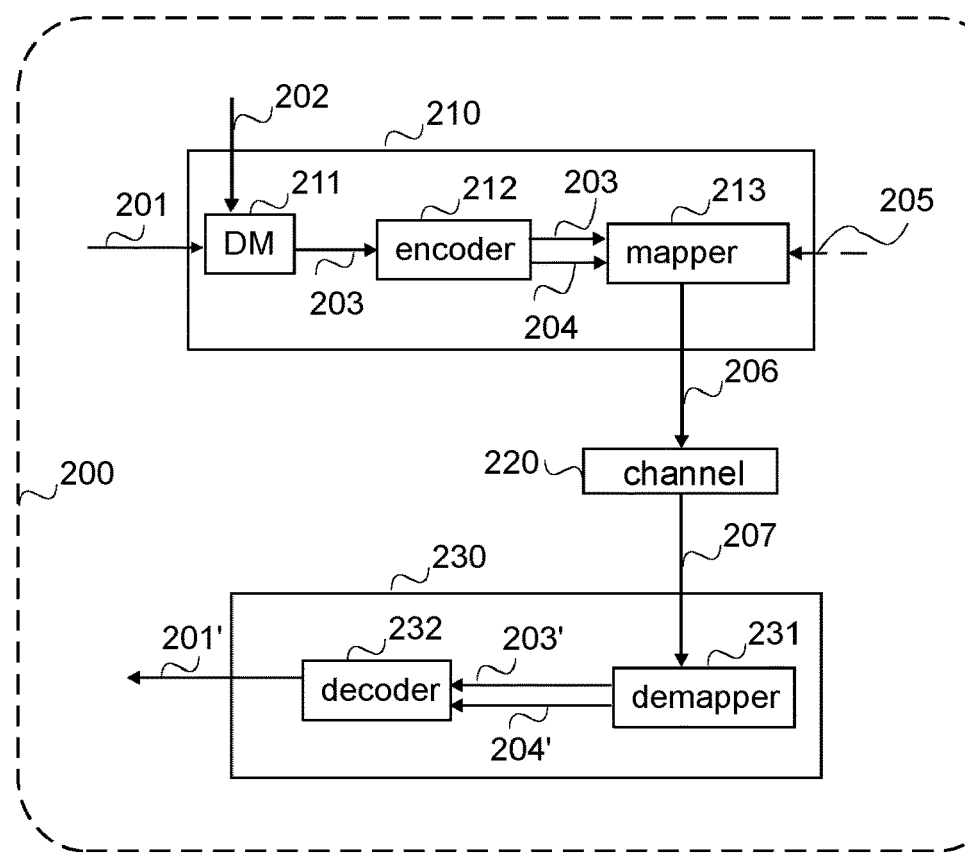
FIG. 2 illustrates an example of an end-to-end system.

FIG. 2 illustrates a general principles of an end-to-end system comprising one or more trained models (or trainable models in a training phase). Optional input is indicated in Figures by a dash line. Herein terms "trainable algorithm", "algorithm with trainable parameters", and "model" are used as synonyms.

Referring to FIG. 2, the end-to-end system 200 comprises a transmitter 210, a channel 220, and a receiver 230.

Figure 6:
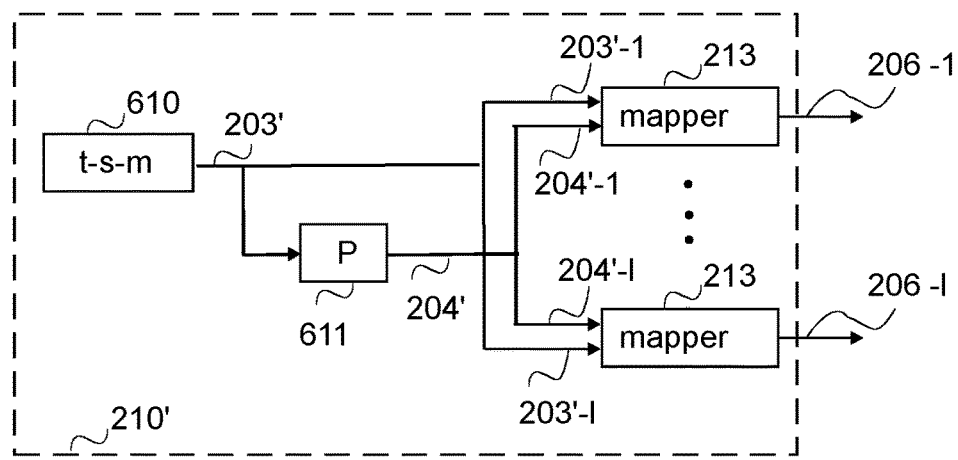

The transmitter 210 comprises a distribution matcher (DM) 211 to which a stream of bits 201 and a target distribution 202 are inputted. The target distribution may be symmetrical or non-symmetrical. The distribution matcher 211 may be implemented using, for example, constant composition distribution matching, or sphere shaping, or shell matching, or any other distribution matching technique resulting to systematic codes. The distribution matcher 211 generates, using the target distribution, from the stream of bits 201, a stream of matched vectors of bits 203. The stream of matched vectors of bits 203 is inputted to a channel encoder 212 to generate a stream of codewords comprising two streams: a systematic part of the matched vectors of bits and parity bits 204. The systematic part of the matched vectors of bits may be called information bits and they can be shaped. The parity bits may be called redundant bits and they cannot be shaped. The channel encoder 211 may use any channel coding scheme, such as low-density parity check coding and turbo coding, for example 202. However, herein it is assumed, for the sake of clarity, that the coding scheme is a systematic coding scheme, which means that the generated systematic part of the matched vectors of bits 203 is identical with the inputted matched vectors of bits. Therefore the same reference number is used. The stream of generated systematic part of the matched vectors of bits 203 and the stream of parity bits 204 are inputted to a mapper 213. In other words, the stream of codewords is inputted to the mapper. The streams are inputted as broken vectors. In other words, assuming n bits per channel, a systematic part of a matched vector of bits is split (broken apart) into l first vectors, all first vectors having the same length k, and the parity bits are split (broken apart) into l second vectors, all second vectors having the same length n-k. (The split structure is illustrated in FIG. 6.) The mapper 213 is based on one or more algorithms with trainable parameters. In other words, the mapper 213 comprises one or more trained models, examples of which will be described below. Depending on an implementation a trained model in the mapper may be a constellation comprising a plurality of sub-constellations with trained parameters as constellation points, or the trained model in the mapper may be for generating a constellation and corresponding constellation points. As a summary, a constellation is at least based on a trained model, which is based on an algorithm with trainable parameters. In the illustrated example, also information 205 indicating channel quality is inputted to the mapper 213. However, that is not always the case, as will be described below. A non-limiting list of the information indicating channel quality includes a signal-to-noise ratio (SNR), an estimation of channel state information (CSI) and a link quality indicator (LQI). In the examples described herein, the signal-to-noise ratio is used as an example of the information indicating channel quality without restricting the examples to the signal-to-noise ratio. The mapper 213 implements a modulation scheme, such as quadrature phase shift keying (QPSK), or quadrature amplitude modulation (QAM), possibly with one or more specific waveforms, such as orthogonal frequency-division multiplexing (OFDM), and maps the one or more inputs to complex baseband channel transmits symbols x 206, as will be described in more detail below. The complex baseband channel transmit symbols 206 are transmitted over the channel 220 to the receiver 230.

In the receiver 230 side, samples of received complex baseband channel symbols y 207 are inputted to a demapper 231, which outputs log-likelihood ratios of received symbols, i.e. log-likelihood ratios of received matched vectors 203' and of received parity bits 204'. The demapper may be any demapper, such as a soft-demapper, configured to receive channel symbols modulated as described herein. (A soft-demapper is a differentiable demapper, which provides soft decision on transmitted symbols.) In some implementations, the demapper 231 may be based on a trainable algorithm and contain a trained model. A channel decoder 232 computes from the log-likelihood ratios 203', 204', using for example bit-metric decoding, or iterative decoding, a stream of output bits 201'.

Figure 3:
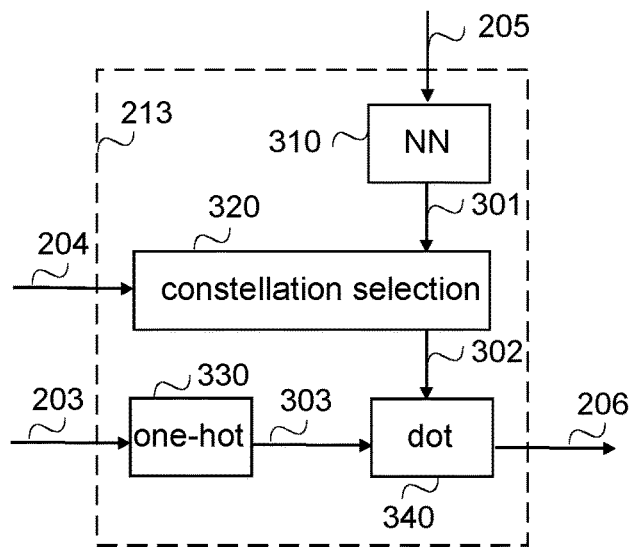
FIGS. 3 to 6 illustrate examples relating to a mapper architecture.

FIG. 3 illustrates an example of a mapper architecture, when the mapper 213 contains a neural network (NN) based model 310.

Referring to FIG. 3, assuming $2^n$ modulation order and a k/n code rate, n being bits per channel use and k being bits of useful information, a codeword, whose length m is large compared to k, is split, as explained above, into matched vectors of bits (matched bit vectors) 203 of length k and parity bit vectors 204 of length n–k, and the vectors are uniquely mapped to create the output 206 comprising complex baseband channel symbols.

More precisely, the signal-to-noise ratio 205 is inputted to a trainable neural network NN 301. The neural network generates a set of $2^{n-k}$ sub-constellations $[C_1, \ldots C_2{}^{n-k}]$ and outputs the sub-constellations 301. The sub-constellations form a constellation. A constellation selection unit 320 receives, as another input, the parity bit vectors 204. The constellation selection unit 320 is configured to select a sub-constellation according to the parity bit vectors. For example, a sub-constellation $C_j$ is selected if a parity bit vector $p_i$ is a binary representation of the index j.

The matched bit vectors $b=[b_1 \ldots b_k]\in\{0,1\}^k$ 203 are uniquely mapped, by a one-hot unit 330, into corresponding one-hot vectors 303. In an one-hot vector s all elements are set to zero except the $s^{th}$ element, which is set to one. The length of the one-hot vector s is $2^k$. The one-hot vector can also be viewed as an integer $s\in\{0 \ldots 2^k-1\}$. For example, matched bit vectors b may be mapped to following corresponding hot vectors s:

b=[0,0,1] s=01000000
b=[0,1,1] s=00010000
b=[1,1,1] s=00000001

The selected sub-constellation C, i.e. output 302, and a hot vector s, i.e. output 303, are inputted to a dot unit 340 which calculates a dot product of the inputs s and C. In other words, the bit vector is mapped to a constellation point _x∈C by taking the dot product of s and C. The thus obtained constellation point x is a complex baseband channel symbol forming part of the output 206 transmitted over the channel.

In another example, as an alternative to calculating the dot product, the input 203, which is an integer, is interpreted (considered) as an index and the constellation point x is selected from the constellation using the index.

Figure 4:
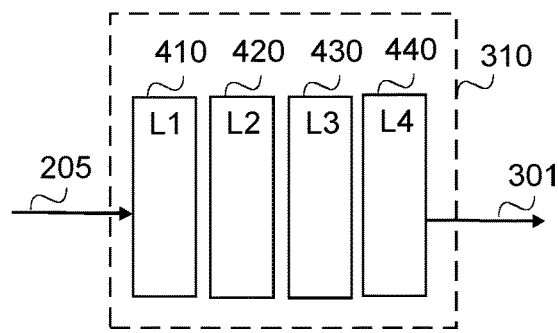

FIG. 4 illustrates an example of an architecture of a neural network 310 in a mapper. Naturally any other type of neural network with any number and any type of layers can be used in the mapper. In the illustrated example of FIG. 4, the neural network 310 of the mapper is a four-layer 410, 420, 430, 440 neural network consisting of a parametric function $g_\psi$ with trainable parameters $\psi$. The parameters are weight matrices and biases of the dense layers of the neural network in the illustrated example. In the illustrated example, the first layer 410 is a dense layer L1, for example a rectified linear unit ($2^n$ units), the second layer 420 is another dense layer L2, for example a rectified linear unit L2 ($2^n$ units), the third layer 430 a real-to-complex (R2C) layer L3, and the fourth (last) layer is a normalization layer L4. The dense layer L1 may be a rectified linear unit ($2^k$ units), and the dense layer L2 may be a dense linear function, wherein k is the number of bits per baseband complex channel symbol. Because there are $2^{(n-k)}$ sub-constellations, a sub-constellation having $2^k$ constellation points which is a complex number with real and imaginary components, the number of units in the layer L2 should be $2^{(n-k)}*2^k*2=2^{(n+1)}$, where the last factor 2 comes from the need to generate the real and imaginary parts of the complex numbers. The real-to-complex layer L3 converts the real outputs of the dense layers L1, L2 to complex numbers. The last layer L4 is a normalization layer to ensure some energy constraints, for example $E\{|x|^2\}=1$, wherein E is energy. The last layer outputs the constellation 301 (i.e. the set of sub-constellations).

In another example, there can be instead of the two dense layers three dense layers. Two of the dense layers may be with the rectified linear unit ($2^n$ unit) activations and one dense layer with $2^n$ units and the identity function as activation.

Figure 5:
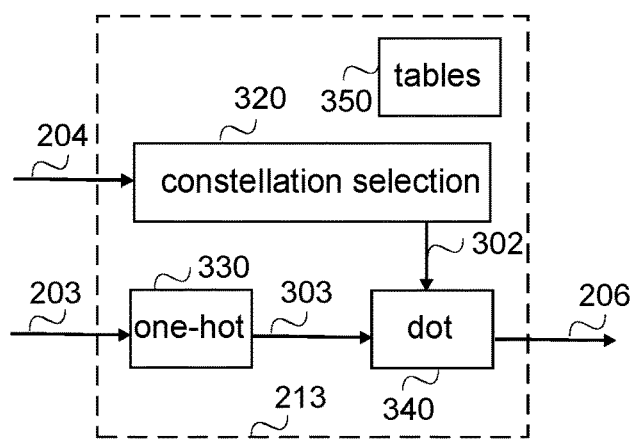

In the above examples, the constellation is a changing constellation that is be a function of the channel quality, i.e. the constellation is changing if inputted information on channel quality changes. FIG. 5 illustrates an example of a mapper architecture, when the mapper 213 contains, instead of the neural network of the example illustrated with FIG. 3, look-up tables 350 as the trained model. In other words, sub-constellations are implemented as look-up tables, the components of the tables being trained parameters (trainable parameters). More precisely, trainable parameters $\psi$ in a parametric function $f_\psi$ are real and imaginary components of $2^k$ constellation points forming $2^{(n-k)}$ sub-constellations. In other words, the $2^k$ constellation points forming the $2^{(n-k)}$ sub-constellations are directly optimised (trained). From an implementation point of view there will be $2^{(n-k)}$ arrays of $2^k*2$ trainable parameters, an array corresponding to a sub-constellation and a row in a specific array corresponding to a constellation point of one of the $2^{(n-k)}$ sub-constellations. The result is a fixed constellation that is not a function of the channel quality, and can be used for all channel qualities. The training process may be the same for the fixed constellation and for the changing constellation.

Referring to FIG. 5, assuming $2^n$ modulation order, and a k/n code rate, n being bits per channel use, a codeword, whose length m is large compared to k, is split, as explained above, into matched vectors of bits (matched bit vectors) 203 of length k and parity bit vectors 204 of length n-k, and the vectors are uniquely mapped to create the output 206 comprising complex baseband channel symbols.

More precisely, the parity bit vectors 204 are inputted to a constellation selection unit 320. The constellation selection unit 320 is configured to select a sub-constellation (look-up table) amongst the look-up tables 350 according to the parity bit vectors. For example, a sub-constellation $C_j$ within the constellation formed by the sub-constellations is selected if a parity bit vector $p_i$ is a binary representation of the index j.

The matched bit vectors $b=[b_1 \ldots b_k]\in\{0,1\}^k$ 203 are uniquely mapped, by a one-hot unit 330, into corresponding one-hot vectors 303.

The selected sub-constellation C, i.e. output 302, and a hot vector s, i.e. output 303, are inputted to a dot unit 340 which calculates a dot product of the inputs s and C. In other words, the bit vector is mapped to a constellation point x∈C by taking the dot product of s and C. The thus obtained constellation point x is a complex baseband channel symbol forming part of the output 206 transmitted over the channel.

To obtain the one or more trained models, one or more algorithms with trainable parameters will be trained. In the training phase, a model for the mapper (as illustrated with any of FIGS. 3, 4 and 5), or an end-to-end system model comprising the model for the mapper, a model of a channel and a model of a demapper (or a model of a receiver), may be used. The end-to-end system model may be used for jointly training the mapper and demapper (if demapper is based on an algorithm with trainable parameters), or training only the mapper (i.e. the neural network in the mapper, or the look-up tables in the mapper). When training only the mapper, the model(s) may be trained online, using a real-life channel to obtain the input 205 (information indicating channel quality).

The information indicating channel quality (205) in the training phase may be a selected signal-to-noise-ratio (SNR). The signal-to-noise ratio may be selected randomly, and it may be selected for each training set forming a batch, for example according to uniform distribution.

When end-to-end offline training is used, the channel may be implemented as inner layers between the transmitter and the receiver. For example, the channel may be a layer which receives random noise as an additional input to the complex baseband channel symbols resulting to differentiated complex baseband channel symbols. Naturally any other differentiable stochastic transformation of the inputted complex baseband channel symbols x may be used to create the output y received in the receiver.

When training only the mapper, the model(s) may be trained online, using a real-life channel to obtain the input 205 (information indicating channel quality).

In the above disclosed solutions at least the geometry of the constellation is trained to enable geometric shaping.

To enable joint probabilistic shaping and geometric shaping considering a given channel model and channel code, the transmitter may be trained using a trainable sampling mechanism, instead of inputting to transmitter a stream of bits 201, as will be done when a model based on the transmitter disclosed on general level in FIG. 2 is trained. FIG. 6 illustrates a training model for the joint probabilistic shaping and geometric shaping, the training in the example being performed without any input that models information to be transmitted. It should be appreciated that channel quality information may be fed to the training model.

Referring to FIG. 6, the transmitter model 210' comprises a trainable sampling mechanism (t-s-m) 610, which is configured to randomly generate bit vectors 203' of the length k according to a trainable distribution P{$\tilde{b}$} of the bit vectors, denoted by $\tilde{b}$. In other words, the trainable distribution is over the bit vectors, not over individual bits. The trainable sampling mechanism 610 may be implemented, for example, using the Gumbel-softmax approach combined with a straight-through estimator as disclosed, for example, in a WIPO application number PCT/EP2019/064146, filed on May 30, 2019 and titled "Learning in Communication Systems", which is assigned to the same applicant and which disclosure is incorporated fully by reference herein. The trainable sampling mechanism may be based on an algorithm with trainable parameters, and the algorithm may take as an input channel quality information. This ensures that the distribution over the matched bit vectors will depend on the channel quality, in the same way as the constellation outputted by the neural network based unit.

The randomly generated bit vectors 203' are also multiplied with a generator matrix P 611 to generate parity bit vectors 204' of the length n-k. The multiplication may be Galois field of two elements (GF(2)). The vectors 203', 204' are split, as described above into l first vectors 203'-1, 203'-l, all first vectors having the same length k, and into l second vectors 204'-1, 204'-l, all second vectors having the same length n-k. The split vectors 203'-1, 203'-l, 204'-1, 204'-l are inputted to a mapper 213 having an algorithm with trainable parameters. Examples of the mapper 213 are given above.

The mapper outputs vectors of symbols 206-1, 206-l, which together model transmissions of modulated symbols 206.

Transmitters trained using the model disclosed in FIG. 6 are implemented in such a way that the incoming stream is inputted to a distribution matcher, which uses as the target distribution the distribution learned during training the model disclosed in FIG. 6.

A model, comprising at least a trainable mapper, instantiated from the description of its architecture, the description being based on what is disclosed above, for example, may be trained online, or offline, or trained offline, deployed in the real environment and then finetuned by online training. When training online, the model is instantiated and created on the environment in which it will be used, and then trained in the real environment. In the offline training the model is trained using training data, and after training, the learned values of the trainable parameters are stored together with model architecture information, to be deployed in the real environment. Below the examples relating to training and deployment are described using the offline training, for the sake of clarity. For one skilled in the art, implementing the examples to the online training, or to pretraining offline and finetuning using online training, is a straightforward task based on the below descriptions.

Figure 7:
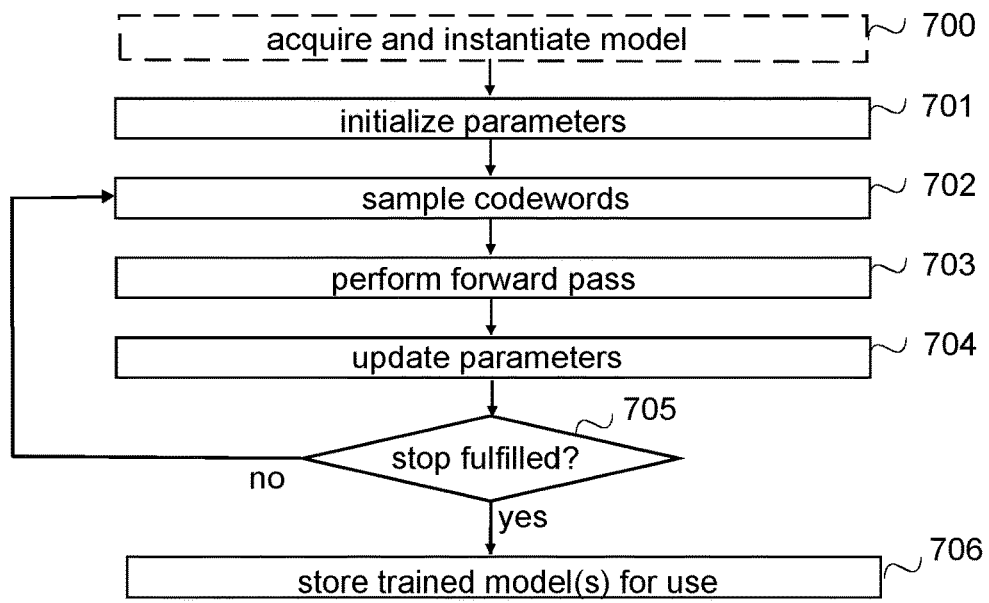
FIG. 7 illustrates an example of a training functionality.

FIG. 7 illustrates a training functionality of an apparatus configured to train at least the algorithm with trainable parameters for mapper (i.e. a trainable mapper). In the illustrated example it is assumed that a differentiable demapper, which provides soft decision on the transmitted bits, is available and that the trainable mapper model, channel model, and demapper are trained as a single neural network in an end-to-end manner to reproduce its inputs at its outputs. However, it should be appreciated that the training may be performed without the channel model and the demapper.

Referring to FIG. 7, when the model, or more precisely its definitions, is acquired and instantiated in block 700 in response to the training being triggered. Then parameters ψ for the mapper are initialized in block 701. Should the single neural network under training be based on the architecture illustrated in FIG. 6, also parameters for the training sampling mechanism are initialized in block 701. For example, random values may be used to initialise the parameters. Then a batch of training data, which in the example is a batch of codewords generated using a systematic channel code, is sampled in block 702, and a forward pass is performed in block 703 in the single neural network to generate soft predictions of the codewords, or more precisely soft predictions of corresponding matched vectors and received parity bits. A systematic code (a systematic channel code) is a code such that the input data of the encoding process is embedded in the encoded output (codeword). The parameters are updated in block 704 by applying one step of gradient descent on the loss (loss function). For example, following loss function may be used:

$$L = -\frac{1}{Bl}\sum_{i=1}^{B}\sum_{j=1}^{l}\left(\sum_{u=1}^{k}(\tilde{b}_{j,u}^{(i)}\log P_D(\tilde{b}_{j,u}^{(i)}\mid y_j) + (1-\tilde{b}_{j,u}^{(i)})\log P_D(1-\tilde{b}_{j,u}^{(i)}\mid y_j)) + \right.$$

$$\left.\sum_{u=1}^{n-k}(p_{j,u}^{(i)}\log P_D(p_{j,u}^{(i)}\mid y_j) + (1-p_{j,u}^{(i)})\log P_D(1-p_{j,u}^{(i)}\mid y_j))\right)$$

wherein

L is the loss (value>1),

B is the batch size of the codewords,
l is the number of split vectors, $\widetilde{b}_{j,u}^{(i)}$ is the $u^{th}$ value of matched bit vector corresponding to the $j^{th}$ j, u matched bit vector of the $i^{th}$ codeword, $P_D(\widetilde{b}_{j,u}^{(i)}|y_j)$ is the soft decision on the matched bit vector,
$(p_{j,u}^{(i)})$ is the $u^{th}$ value of parity bits corresponding to the $j^{th}$ matched bit vector of the $i^{th}$ codeword, and
$P_D(p_{j,u}^{(i)}|y_j)$ is the soft decision on the parity bits.

Since the loss function operates on bits, the labeling of the constellation points, i.e. mapping of the matched bit vectors of length k onto $2^k$ constellation points, is jointly learned with the constellation geometry.

Should the single neural network under training be based on the architecture illustrated in FIG. 6, the loss function should incorporate a rate loss due to shaping redundancy. The shaping redundancy is added at the distribution matcher to achieve the target distribution. Therefore following modified loss function, based on the above loss function L may be used:

$$\hat{L} = L + R_{loss}$$

wherein $$R_{loss} = k + \sum_{i=1}^{2^k} P\{\tilde{b}\} \log P\{\tilde{b}\}$$

wherein
$R_{loss}$ = rate loss,
k = length of vector, and
$P\{\tilde{b}\}$ is the trainable distribution implemented by the trainable sampling mechanism, and
log $P\{\tilde{b}\}$ is the sign opposite of the entropy of the distribution over the shaped bit vectors of length.

When the parameters have been updated at block 704, it is checked, in block 705 whether a stop criterion for training is fulfilled. The stop criterion may be "stop when the loss function did not decrease during a predefined number of update iterations" or "stop after a predetermined number of update iterations", just to list some examples of a stop criterion.

If the stop criterion is not fulfilled (block 705: no), the process returns to block 702 to sample the codewords. If the stop criterion is fulfilled (block 705: yes), the trained model for the mapper is ready, and stored in block 706 to be used in transmitters.

By performing the above training, the algorithm with trainable parameters for the mapper provides an optimized mapper (trained mapper) and thereby an optimised modulation scheme. Optimization parameters (training parameters) include the batch-size B of the codewords and the learning-rate. Further examples include other parameters of the chosen Stochastic gradient descent (SGD) variant, such as Adam, RMSProp and Momentum.

When the demapper is a neural network based entity, it may be trained together with the trainable mapper, using a little bit modified training process of FIG. 7. For example, in block 701 also the trainable parameters for the demapper are initialized, and the parameters updated in block 704. Further, in block 706 also the trained model for the channel decoder is stored.

Figure 8:
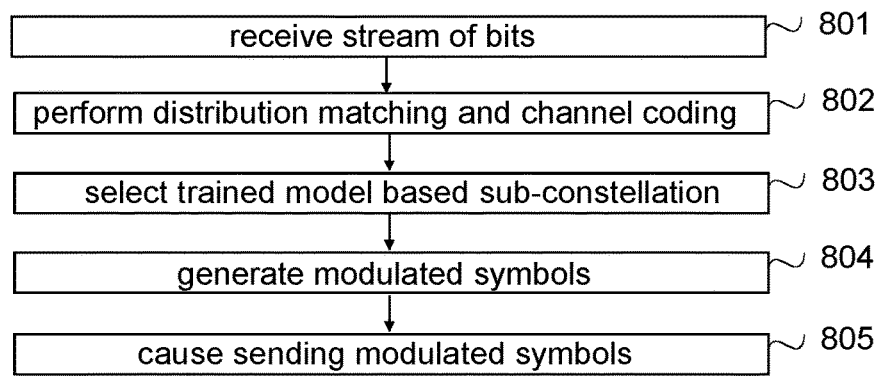
FIG. 8 illustrates an example functionality of transmitter.

FIG. 8 illustrates a basic functionality of a transmitter, which comprises a trained model based mapper.

Referring to FIG. 8, when a stream of bits to be transmitted is received in block 801, a distribution matching and channel coding is performed in block 802 to the stream to generate a matched stream comprising matched bit vectors and a stream of parity bit vectors. The stream of parity bits vectors are used in block 803 to select a sub-constellation amongst a plurality of sub-constellations of a constellation. Depending on the implementation, the constellation is the trained model, or the constellation is generated by the trained model, as described above. The matched stream and the selected sub-constellation are used in block 804 to generate modulated symbols from the stream of bits received, and sending the modulated symbols, i.e. complex baseband channel symbols, is caused in block 805. Shortly, information bits and redundant bits are inputted to the trained model based mapper which maps, using a sub-constellation selected using the redundant bits, the information bits to modulated symbols.

As can be seen from the above examples, solutions providing a code rate k/n with any values of k and n are disclosed. Compared to the probabilistic amplitude shaping, in which the code rate is in practice limited to a code rate (n–1)/n, in the disclosed solutions there are less constraints on code values. Hence, the solution provides a straightforward use of a wide range of code rates, which may be smaller, bigger or equal to the code rate (n–1)/n. Further, the mapper can be trained (optimized) for the actual parity bits distribution.

The blocks, related functions, and information exchanges described above by means of FIGS. 2 to 8 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 9:
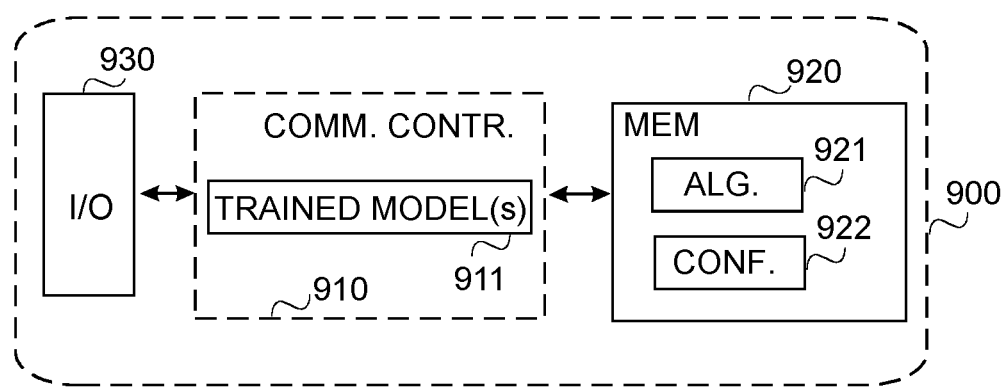
FIGS. 9 and 10 are schematic block diagrams.
Figure 10:
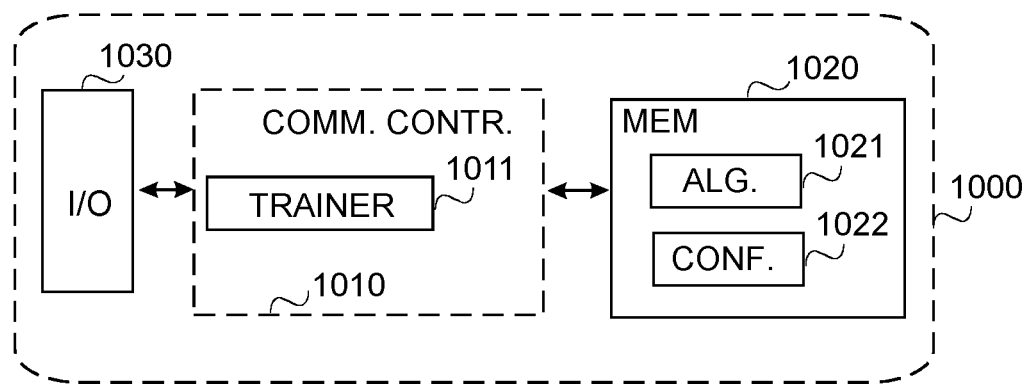

FIGS. 9 and 10 illustrate apparatuses comprising a communication controller 910, 1010 such as at least one processor or processing circuitry, and at least one memory 920, 1020 including a computer program code (software, algorithm) ALG. 921, 1021, wherein the at least one memory and the computer program code (software, algorithm) are configured, with the at least one processor, to cause the respective apparatus to carry out any one of the embodiments, examples and implementations described above. FIG. 9 illustrates an apparatus comprising at least the transmitter with one or more trained model, and possibly also a receiver, and FIG. 10 illustrates an apparatus for training the one or more models. Naturally, the apparatuses may be merged, i.e. model(s) trained and trained model(s) used in the same apparatus. The apparatuses of FIGS. 9 and 10 may be electronic devices.

Referring to FIGS. 9 and 10, the memory 920, 1020 may be implemented using any suitable data storage technology, such as semiconductor based memory devices, flash memory, magnetic memory devices and systems, optical memory devices and systems, fixed memory and removable memory. The memory may comprise a configuration storage CONF. 921, 1021, such as a configuration database, for at least storing one or more configurations and/or corresponding parameters/parameter values, for example the one or more trained models, i.e. parameters with values and model architecture, and/or training data and information to create models for training. The memory 920, 1020 may further store a data buffer for data waiting for transmission, for example.

Referring to FIG. 9, the apparatus 900 may further comprise a communication interface 930 comprising hardware and/or software for realizing communication connectivity according to one or more radio communication protocols. The communication interface 930 may provide the apparatus with radio communication capabilities with one or more base stations (access nodes) of a wireless network and/or with one or more user terminals. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 910, using the above disclosed trained models, for example.

The apparatus 900 may further comprise an application processor (not illustrated in FIG. 9) executing one or more computer program applications that generate a need to transmit and/or receive data The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

The communication controller 910 may comprise one or more trained models (TRAINED MODEL(s)) 911 configured to perform at least the mapping, possibly also distribution and/or demapping according to any one of the embodiments/examples/implementations described above.

Referring to FIG. 10, the apparatus for the training comprises a communication interface 1030 comprising hardware and/or software for realizing communication connectivity according to one or more radio communication protocols. The communication interface 1030 may provide the apparatus with communication capabilities to apparatuses comprising the trained one or more models. The communication interface may comprise standard well-known components such as an amplifier, filter, frequency-converter, (de)modulator, and encoder/decoder circuitries and one or more antennas.

The communication controller 1010 comprises a trainer circuitry TRAINER 1011 configured to train at least one or more trainable functions for mapping, possible also one or more trainable functions for the target distribution and/or demapping according to any one of the embodiments/examples/implementations described above.

In an embodiment, at least some of the functionalities of the apparatus of FIG. 10 may be shared between two physically separate devices, forming one operational entity. Therefore, the apparatus may be seen to depict the operational entity comprising one or more physically separate devices for executing at least some of the processes described with respect to the training apparatus.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A transmitter, comprising:
   at least one processor; and
   at least one memory including computer program code, the at least one memory and computer program code configured to, with the at least one processor, cause the transmitter to perform at least:
   inputting information indicating channel quality to a trained neural network based model for a mapper, wherein the trained neural network based model is based on a first algorithm with trainable parameters, during training of which a loss function operating on bits has been used and mapping of matched bit vectors of length k onto $2^k$ constellation points has been jointly learned with constellation geometry, and wherein the trained neural network based model outputs a constellation comprising a plurality of sub-constellations;
   receiving bits to be sent from the transmitter;
   performing distribution matching using as a target distribution a distribution, which is based a second algorithm with trainable parameters, trained during training of the first algorithm and stored with the trained neural network based model, and channel coding to the received bits to generate matched bits and parity bits;
   using the parity bits to select a sub-constellation among the plurality of sub-constellations of the constellation;
   using the matched bits and the selected sub-constellation to generate modulated symbols; and
   causing sending the modulated symbols.

2. The transmitter as claimed in claim 1, wherein the at least one memory and computer program code are configured to, with the at least one processor, cause the transmitter further to perform:
   mapping the matched bits to one-hot vectors; and
   taking dot products of the one-hot vectors and the sub-constellation to generate the modulated symbols.

3. An apparatus, comprising:
   at least one processor; and
   at least one memory including computer program code, the at least one memory and computer program code configured to, with the at least one processor, cause the apparatus to perform at least:
   acquiring a neural network based model modeling at least a mapper at a transmitter side, wherein at least a first algorithm with trainable parameters to model the mapper and a second algorithm with trainable parameters to model a trainable distribution is acquired;
   initializing parameters for the first algorithm and for the second algorithm;
   sampling a batch of training data;
   generating, as part of the sampling, bit vectors according to the trainable distribution using channel quality information as input to the second algorithm, the bit vectors generated forming part of the batch of training data;
   performing to the batch a forward pass through the model to generate soft predictions of the batch;
   updating the parameters by applying one step of a stochastic gradient descent on a loss function, which operates on bits causing that mapping of matched bit vectors of length k onto $2^k$ constellation points is jointly learned with constellation geometry;
   training the parameters by repeating the sampling, performing the forward pass and updating until a stop criterion is fulfilled;
   stopping the training when the stop criterion is fulfilled; and
   storing, after stopping the training, a trained neural network based model for the mapper to be used in transmitters for outputting constellations as a function of channel quality, an output constellation comprising a plurality of sub-constellations, and the trained parameters of the second algorithm to be used as a target distribution in the transmitters.

4. The apparatus as claimed in claim 3, wherein the batch comprises a batch of codewords generated using a systematic channel code.

5. A method for a transmitter, the method comprising:
   inputting information indicating channel quality to a trained neural network based model for a mapper, wherein the trained neural network based model is based on a first algorithm with trainable parameters, during training of which a loss function operating on bits has been used and mapping of matched bit vectors of length k onto $2^k$ constellation points has been jointly learned with constellation geometry, and wherein the trained neural network based model outputs a constellation comprising a plurality of sub-constellations;
   receiving bits to be sent from the transmitter;
   performing distribution matching using as a target distribution a distribution, which is based on a second algorithm with trainable parameters, trained during training of the first algorithm and stored with the trained neural network based model, and channel coding to the received bits to generate matched bits and parity bits;

using the parity bits to select a sub-constellation among the plurality of sub-constellations of the constellation;

using the matched bits and the selected sub-constellation to generate modulated symbols; and causing sending the modulated symbols.

6. The method as claimed in claim 5, further comprising:

mapping the matched bits to one-hot vectors; and taking dot products of the one-hot vectors and the sub-constellation to generate the modulated symbols.

7. A method, comprising:

acquiring a neural network based model modeling at least a mapper at a transmitter side, wherein at least a first algorithm with trainable parameters used to model the mapper and a second algorithm with trainable parameters to model a trainable distribution is acquired;

initializing parameters for the first algorithm and for the second algorithm;

sampling a batch of training data;

generating, as part of the sampling, bit vectors according to the trainable distribution, the bit vectors generated forming part of the batch of training data;

performing to the batch a forward pass through the model to generate soft predictions of the batch;

updating the parameters by applying one step of a stochastic gradient descent on a loss function which operates on bits causing that mapping of matched bit vectors of length k onto $2^k$ constellation points is jointly learned with constellation geometry;

training the parameters by repeating the sampling, performing the forward pass and updating until a stop criterion is fulfilled;

stopping the training when the stop criterion is fulfilled; and storing, after stopping the training, a trained neural network based model for the mapper to be used in transmitters for outputting constellations as a function of channel quality, an output constellation comprising a plurality of sub-constellations, and the trained parameters of the second algorithm to be used as a target distribution in the transmitters.

8. The method as claimed in claim 7, wherein the batch comprises a batch of codewords generated using a systematic channel code.

9. A computer program embodied on a non-transitory computer-readable storage medium, said computer program comprising one or more instructions which, when executed by one or more processors, cause an apparatus to carry out at least:

inputting information indicating channel quality to a trained neural network based model for a mapper, wherein the trained neural network based model is based on a first algorithm with trainable parameters, during training of which a loss function operating on bits has been used and mapping of matched bit vectors of length k onto $2^k$ constellation points has been jointly learned with constellation geometry, and wherein the trained neural network based model outputs a constellation comprising a plurality of sub-constellations;

performing, in response to receiving bits to be sent, distribution matching using as a target distribution a distribution, which is based on a second algorithm with trainable parameters, trained during training of the first algorithm and stored with the trained neural network based model, and channel coding to the received bits to generate matched bits and parity bits;

using the parity bits to select a sub-constellation among the plurality of sub-constellations of the constellation;

using the matched bits and the selected sub-constellation to generate modulated symbols; and causing sending the modulated symbols.

10. The computer program as claimed in claim 9, further comprising instructions which cause the apparatus to perform:

mapping the matched bits to one-hot vectors; and taking dot products of the one-hot vectors and the sub-constellation to generate the modulated symbols.

11. A computer program embodied on a non-transitory computer-readable storage medium, said computer program comprising one or more instructions which, when executed by one or more processors, cause an apparatus to carry out at least:

acquiring a neural network based model modeling at least a mapper at a transmitter side, wherein at least a first algorithm with trainable parameters used to model the mapper and a second algorithm with trainable parameters to model a trainable distribution is acquired;

initializing parameters for the first algorithm and for the second algorithm;

sampling a batch of training data;

generating, as part of the sampling, bit vectors according to the trainable distribution, the bit vectors generated forming part of the batch of training data;

performing to the batch a forward pass through the model to generate soft predictions of the batch;

updating the parameters by applying one step of a stochastic gradient descent on a loss function, which operates on bits causing that mapping of matched bit vectors of length k onto $2^k$ constellation points is jointly learned with constellation geometry;

training the parameters by repeating the sampling, performing the forward pass and updating until a stop criterion is fulfilled;

stopping the training when the stop criterion is fulfilled; and storing, after stopping the training, a trained neural network based model for the mapper to be used in transmitters for outputting constellations as a function of channel quality, an output constellation comprising a plurality of sub-constellations, and the trained parameters of the second algorithm to be used as a target distribution in the transmitters.

12. The computer program as claimed in claim 11, wherein the batch comprises a batch of codewords generated using a systematic channel code.

* * * * *